(12) United States Patent
Yang et al.

(10) Patent No.: US 11,257,007 B2
(45) Date of Patent: Feb. 22, 2022

(54) METHOD AND APPARATUS FOR ENCRYPTING DATA, METHOD AND APPARATUS FOR TRAINING MACHINE LEARNING MODEL, AND ELECTRONIC DEVICE

(71) Applicant: Advanced New Technologies Co., Ltd., Grand Cayman (KY)

(72) Inventors: Xinxing Yang, Hangzhou (CN); Shaosheng Cao, Hangzhou (CN); Jun Zhou, Hangzhou (CN); Xiaolong Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/587,977

(22) Filed: Sep. 30, 2019

(65) Prior Publication Data

US 2020/0034740 A1 Jan. 30, 2020

Related U.S. Application Data

(63) Continuation of application No. PCT/CN2018/097339, filed on Jul. 27, 2018.

(30) Foreign Application Priority Data

Aug. 1, 2017 (CN) .......................... 201710647102.6

(51) Int. Cl.
*G06N 20/00* (2019.01)
*G06F 17/16* (2006.01)
(Continued)

(52) U.S. Cl.
CPC ............. *G06N 20/00* (2019.01); *G06F 17/16* (2013.01); *G06F 17/18* (2013.01); *G06K 9/6256* (2013.01)

(58) Field of Classification Search
None
See application file for complete search history.

(56) References Cited

U.S. PATENT DOCUMENTS

2008/0031498 A1* 2/2008 Corcoran ........... G06K 9/00275
382/118
2011/0091113 A1 4/2011 Ito et al.
(Continued)

FOREIGN PATENT DOCUMENTS

CN 102982349 3/2013
CN 104573720 4/2015
(Continued)

OTHER PUBLICATIONS

Banu, R.V. et al., "Preservation of Data Privacy using PCA based Transformation," 2009 Intl. Conf. on Advances in Recent Tech. in Comm. and Computing (2009) 5 pp. (Year: 2009).*

(Continued)

*Primary Examiner* — Brian M Smith
(74) *Attorney, Agent, or Firm* — Fish & Richardson P.C.

(57) ABSTRACT

An N×M dimensional target matrix is generated based on N data samples and M dimensional data features respectively corresponding to the N data samples. Encryption calculation is performed on the N×M dimensional target matrix based on a Principal Component Analysis (PCA) algorithm to obtain an N×K dimensional encryption matrix K is less than M. The N×K dimensional encryption matrix is transmitted to a modeling server. The modeling server trains a machine learning model by using the N×K dimensional encryption matrix as a training sample.

15 Claims, 9 Drawing Sheets

(51) Int. Cl.
*G06F 17/18* (2006.01)
*G06K 9/62* (2006.01)

(56) References Cited

U.S. PATENT DOCUMENTS

| | | | |
|---|---|---|---|
| 2011/0307424 A1 | 12/2011 | Jin et al. | |
| 2012/0078944 A1* | 3/2012 | Lloyd | G05B 23/027 |
| | | | 707/769 |
| 2016/0132787 A1 | 5/2016 | Drevo et al. | |
| 2016/0283738 A1* | 9/2016 | Wang | G06N 20/00 |
| 2018/0018590 A1* | 1/2018 | Szeto | G06N 20/00 |

FOREIGN PATENT DOCUMENTS

| | | |
|---|---|---|
| CN | 105303197 | 2/2016 |
| CN | 105488539 | 4/2016 |
| CN | 105787557 | 7/2016 |
| CN | 105893331 | 8/2016 |
| WO | WO 03021528 | 4/2015 |

OTHER PUBLICATIONS

Bellet, A. et al., "Fast and differentially private algorithms for decentralized collaborative machine learning," downloaded from < arxiv.org/abs/1705.08435v1> (May 23, 2017) 18 pp. (Year: 2017).*

Ahmed, M. et al, "A survey of anomaly detection techniques in financial domain," Future Generation Computer Systems, vol. 55 (2016) pp. 278-288. (Year: 2016).*

Jordan, M.I. et al, "Machine learning: Trends, perspectives, and prospects," Science, vol. 349, Issue 6245 (Jul. 17, 2015) pp. 255-260. (Year: 2015).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/097339, dated Sep. 28, 2018, 8 pages (with partial English translation).

Chabathula et al, "Comparative Study of Principal Component Analysis Based Intrusion Detection Approach Using Machine Learning Algorithms," IEEE, Mar. 26, 2015, 6 pages.

Extended European Search Report in European Appln No. 18840540.1, dated May 20, 2020, 9 pages.

George et al, "Anomaly Detection based on Machine Learning: Dimensionality Reduction using PCA and Classification using SVM", International Journal of Computer Applications, Jun. 30, 2012, vol. 47, No. 21, 3 pages.

Howley et al, "The effect of principal component analysis on machine learning accuracy with high-dimensional spectral data," Sep. 1, 2006, 8 pages.

Pajouh et al, "A two-layer dimension reduction and twotier classification model for anomalybased intrusion detection in IoT backbone networks," IEEE Transactions on Emerging Topics in Computing, Nov. 29, 2016, 11 pages.

Xu, "Adaptive Intrusion Detection Based on Machine Learning: Feature Extraction, Classifier Construction and Sequential Pattern Prediction," International Journal of Web Services Practices, Dec. 31, 2006, 10 pages.

* cited by examiner

|  | f1 | f2 | f3 | – | – | fm |
|---|---|---|---|---|---|---|
| C1 | | | | | | |
| C2 | | | | | | |
| C3 | | | | | | |
| – | | | | | | |
| – | | | | | | |
| Cn | | | | | | |

Target matrix (NxM)

Cm: m-dimensional data feature
fn: nth data sample

FIG. 2

METHOD AND APPARATUS FOR ENCRYPTING DATA, METHOD AND APPARATUS FOR TRAINING MACHINE LEARNING MODEL, AND ELECTRONIC DEVICE

CROSS-REFERENCE TO RELATED APPLICATIONS

This application is a continuation of PCT Application No. PCT/CN2018/097339, filed on Jul. 27, 2018, which claims priority to Chinese Patent Application No. 201710647102.6, filed on Aug. 1, 2017, and each application is hereby incorporated by reference in its entirety.

TECHNICAL FIELD

The present specification relates to the field of computer applications, and in particular, to a method and apparatus for encrypting data, a method and apparatus for training a machine learning model, and an electronic device.

BACKGROUND

With the rapid development of Internet technologies, networking and transparency of personal data of users has become an irresistible trend. Some service platforms providing the users with Internet services can collect massive user data by collecting daily service data of the users. The user data is very valuable "resources" for operators of the service platforms. The operators of the service platforms can mine a large amount of valuable information from these "resources" through data mining and machine learning. For example, in practice, with reference to a specific service scenario, data features in several dimensions can be extracted from the massive user data. The extracted features are used as training samples for training and constructing a machine learning model by using a specific machine learning algorithm. Then the trained machine learning model is used in the service scenario to guide service operations.

SUMMARY

The present specification provides a method for encrypting data, and the method includes the following: generating an N×M dimensional target matrix based on N data samples and M dimensional data features respectively corresponding to the N data samples; performing encryption calculation on the target matrix based on a Principal Component Analysis (PCA) algorithm to obtain an N×K dimensional encryption matrix, where K is less than M; and transmitting the encryption matrix to a modeling server, where the encryption matrix is used to train a machine learning model.

Optionally, the performing encryption calculation on the target matrix based on a PCA algorithm to obtain an encrypted N×K dimensional encryption matrix further includes the following: separately performing zero averaging on values of vectors corresponding to the M dimensional data features in the target matrix; calculating a covariance matrix that corresponds to the target matrix and that is obtained after the zero averaging; calculating eigenvalues of the covariance matrix and eigenvectors corresponding to the eigenvalues; sorting the calculated eigenvectors based on the corresponding eigenvalues, and extracting K eigenvectors with the largest eigenvalues to generate an M×K dimensional projection matrix; and multiplying the target matrix by the projection matrix to obtain the N×K dimensional encryption matrix.

Optionally, the method further includes the following: locally storing the projection matrix as the encryption matrix.

Optionally, the performing encryption calculation on the target matrix based on a PCA algorithm to obtain an encrypted N×K dimensional encryption matrix includes the following: determining whether the projection matrix is locally stored; in response to determining that the projection matrix is locally stored, multiplying the N×M dimensional target matrix by the projection matrix to obtain the N×K dimensional encryption matrix; and in response to determining that the projection matrix is not locally stored, performing encryption calculation on the target matrix based on the PCA algorithm to obtain the N×K dimensional encryption matrix.

Optionally, the method further includes the following: if the data features change in terms of a dimension, or meanings represented by the data features change, performing encryption calculation on the target matrix based on the PCA algorithm again, and updating the locally stored projection matrix based on the recalculated projection matrix.

The present specification further provides an apparatus for encrypting data, and the apparatus includes the following: a generation module, configured to generate an N×M dimensional target matrix based on N data samples and M dimensional data features respectively corresponding to the N data samples; a calculation module, configured to perform encryption calculation on the target matrix based on a PCA algorithm to obtain an N×K dimensional encryption matrix, where K is less than M; and a transmission module, configured to transmit the encryption matrix to a modeling server, where the encryption matrix is used to train a machine learning model.

Optionally, the calculation module is configured to: separately perform zero averaging on values of vectors corresponding to the M dimensional data features in the target matrix; calculate a covariance matrix that corresponds to the target matrix and that is obtained after the zero averaging; calculate eigenvalues of the covariance matrix and eigenvectors corresponding to the eigenvalues; sort the calculated eigenvectors based on the corresponding eigenvalues, and extract K eigenvectors with the largest eigenvalues to generate an M×K dimensional projection matrix; and multiply the target matrix by the projection matrix to obtain the N×K dimensional encryption matrix.

Optionally, the apparatus further includes the following: a storage module, configured to locally store the projection matrix as the encryption matrix.

Optionally, the calculation module is further configured to: determine whether the projection matrix is locally stored; in response to determining that the projection matrix is locally stored, multiply the N×M dimensional target matrix by the projection matrix to obtain the N×K dimensional encryption matrix; and in response to determining that the projection matrix is not locally stored, perform encryption calculation on the target matrix based on the PCA algorithm to obtain the N×K dimensional encryption matrix.

Optionally, the apparatus further includes the following: an update module, configured to: if the data features change in terms of a dimension, or meanings represented by the data features change, perform encryption calculation on the target matrix based on the PCA algorithm again, and update the locally stored projection matrix based on the recalculated projection matrix.

The present specification further provides a method for training a machine learning model, and the method includes the following: receiving an encryption matrix transmitted by a data provider server, where the encryption matrix is an N×K dimensional encryption matrix obtained by the data provider server by performing encryption calculation on an N×M dimensional target matrix based on a PCA algorithm, and K is less than M; and training a machine learning model by using the encryption matrix as a training sample.

Optionally, the training a machine learning model by using the encryption matrix as a training sample includes the following: combining the encryption matrix with a local training sample by using the encryption matrix as the training sample, and training the machine learning model based on a combined training sample.

The present specification further provides an apparatus for training a machine learning model, and the apparatus includes the following: a receiving module, configured to receive an encryption matrix transmitted by a data provider server, where the encryption matrix is an N×K dimensional encryption matrix obtained by the data provider server by performing encryption calculation on an N×M dimensional target matrix based on a PCA algorithm, and K is less than M; and a training module, configured to train a machine learning model by using the encryption matrix as a training sample.

Optionally, the training module is configured to: combine the encryption matrix with a local training sample by using the encryption matrix as the training sample, and train the machine learning model based on a combined training sample.

The present specification further provides a system for training a machine learning model, and the system includes the following: a data provider server, configured to generate an N×M dimensional target matrix based on N data samples and M dimensional data features respectively corresponding to the N data samples; perform encryption calculation on the target matrix based on a PCA algorithm to obtain an N×K dimensional encryption matrix, where K is less than M; and transmit the encryption matrix to a modeling server; and the modeling server, configured to train a machine learning model based on the encryption matrix.

Optionally, the modeling server is further configured to: combine the encryption matrix with a local training sample by using the encryption matrix as a training sample, and train the machine learning model based on a combined training sample.

The present specification further provides an electronic device, including the following: a processor; and a memory, configured to store a machine executable instruction.

By reading and executing the machine executable instruction that is stored in the memory and that corresponds to control logic for data encryption, the processor is configured to: generate an N×M dimensional target matrix based on N data samples and M dimensional data features respectively corresponding to the N data samples; perform encryption calculation on the target matrix based on a PCA algorithm to obtain an N×K dimensional encryption matrix, where K is less than M; and transmit the encryption matrix to a modeling server, where the encryption matrix is used to train a machine learning model.

The present specification further provides an electronic device, including the following: a processor; and a memory, configured to store a machine executable instruction.

By reading and executing the machine executable instruction that is stored in the memory and that corresponds to control logic for machine learning model training, the processor is configured to: receive an encryption matrix transmitted by a data provider server, where the encryption matrix is an N×K dimensional encryption matrix obtained by the data provider server by performing encryption calculation on an N×M dimensional target matrix based on a PCA algorithm, and K is less than M; and train a machine learning model by using the encryption matrix as a training sample.

In the present specification, the N×M dimensional target matrix is generated based on the N data samples and the M dimensional data features respectively corresponding to the N data samples; encryption calculation is performed on the target matrix based on the PCA algorithm to obtain the encrypted N×K dimensional encryption matrix; and then the encryption matrix is transmitted to the modeling server, so that the modeling server trains the machine learning model by using the encryption matrix as the training sample.

After the encryption matrix encrypted based on the PCA algorithm is transmitted to the modeling server, the modeling server usually cannot restore an original target matrix based on the encrypted encryption matrix, so that private data of a user can be protected to the greatest extent, thereby alleviating privacy disclosure of the user caused in a process of submitting a data sample to the modeling server for model training.

In addition, after encryption calculation is performed on the target matrix based on the PCA algorithm, the obtained encryption matrix includes fewer dimensions than the original target matrix, so that transmission overheads for transmitting a data sample to the modeling server can be reduced. In addition, an amount of information in an original data sample can be retained to the greatest extent when encryption calculation is performed on the target matrix by using the PCA algorithm, so that model training accuracy can still be ensured when the encrypted encryption matrix is transmitted to the modeling server for model training.

BRIEF DESCRIPTION OF DRAWINGS

FIG. 2 is a schematic diagram illustrating an N×M dimensional target matrix, according to an implementation of the present specification;

DESCRIPTION OF IMPLEMENTATIONS

Figure 1:
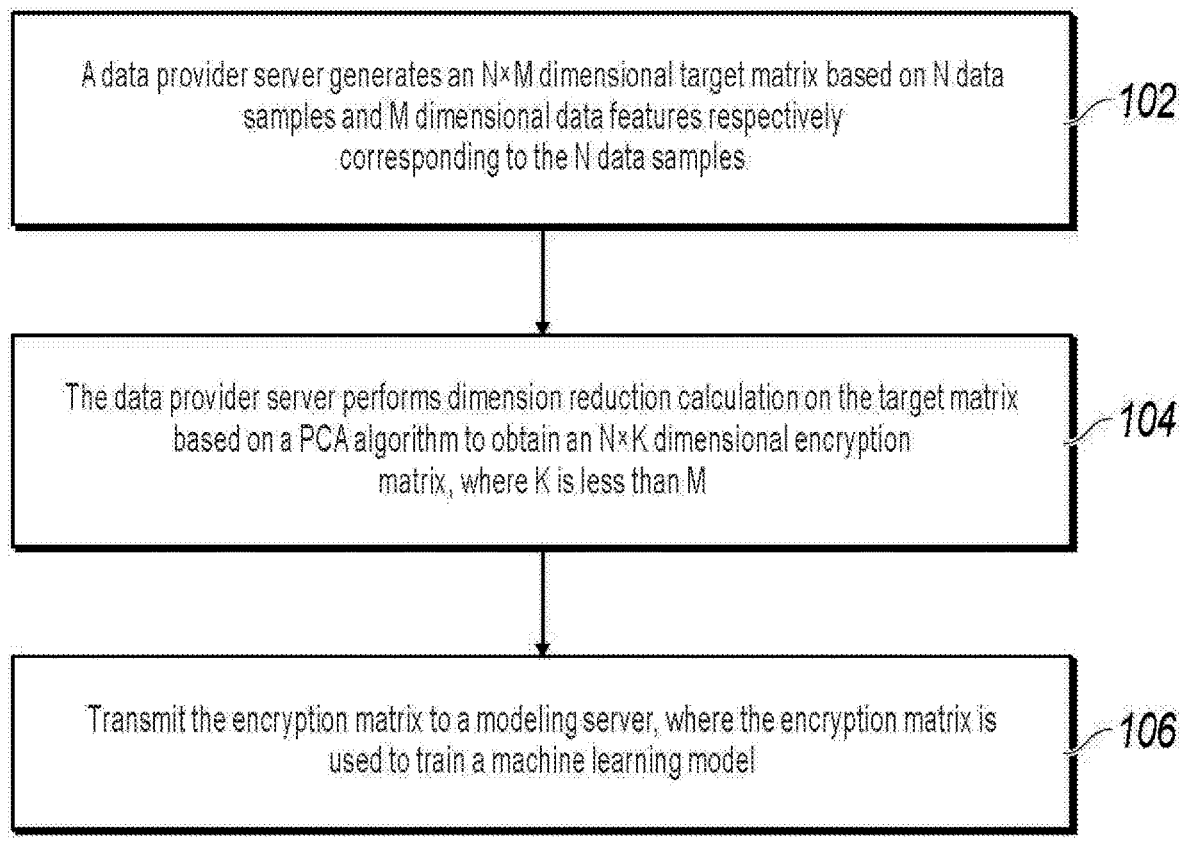
FIG. 1 is a flowchart illustrating a method for encrypting data, according to an implementation of the present specification.

In the big data era, various types of useful information can be obtained by mining massive data. Therefore, data is very important. Different institutions have respective data, but a data mining effect of any institution is subject to a data amount and a data type of the institution. A direct solution to this problem is as follows: A plurality of institutions cooperate with each other to share data, so as to achieve a better data mining effect, thereby achieving win-win.

However, for a data owner, data is an asset of great value. In addition, for purposes such as privacy protection, the data owner is usually unwilling to provide data. In this situation, it is very difficult to perform "data sharing" in practice. Therefore, how to achieve data sharing while data security is ensured has become a top concern in the industry.

The present specification is intended to provide a technical solution. In this technical solution, original user data needed for modeling is encrypted based on a PCA algorithm to perform privacy protection on the original user data and retain an amount of information in the original user data to the greatest extent, so that user privacy can be protected without sacrificing modeling accuracy.

During implementation, M-dimensional data features can be respectively extracted from N data samples needed for modeling, and an N×M dimensional target matrix is generated based on the N data samples and the M dimensional data features respectively corresponding to the N data samples.

After the N×M dimensional target matrix is generated, encryption calculation can be performed on the target matrix based on a PCA algorithm to obtain an encrypted N×K dimensional encryption matrix, and the encryption matrix is transmitted to a modeling server as a training sample, where K is less than M.

After receiving the encryption matrix, the modeling server can train a machine learning model by using the encryption matrix as the training sample. For example, the modeling server can combine the encryption matrix with a local training sample, and then train the machine learning model based on a combined training sample.

After the encryption matrix encrypted based on the PCA algorithm is transmitted to the modeling server, the modeling server usually cannot restore an original target matrix based on the encrypted encryption matrix, so that private data of a user can be protected to the greatest extent, thereby alleviating privacy disclosure of the user caused in a process of submitting a data sample to the modeling server for model training.

In addition, after encryption calculation is performed on the target matrix based on the PCA algorithm, the obtained encryption matrix includes fewer dimensions than the original target matrix, so that transmission overheads for transmitting a data sample to the modeling server can be reduced. In addition, an amount of information in an original data sample can be retained to the greatest extent when encryption calculation is performed on the target matrix by using the PCA algorithm, so that model training accuracy can still be ensured when the encrypted encryption matrix is transmitted to the modeling server for model training.

The following provides detailed descriptions with reference to specific application scenarios by using specific implementations.

FIG. 1 illustrates a method for encrypting data, according to an implementation of the present specification. The method is applied to a data provider server, and includes the following steps:

Step 102: Generate an N×M dimensional target matrix based on N data samples and M dimensional data features respectively corresponding to the N data samples.

Step 104: Perform dimension reduction calculation on the target matrix based on a PCA algorithm to obtain an encrypted N×K dimensional encryption matrix, where K is less than M.

Step 106: Transmit the encryption matrix to a modeling server, where the encryption matrix is used to train a machine learning model.

The data provider server can be connected to the modeling server, and provide the modeling server with a data sample needed for modeling.

For example, in practice, the data provider server and the modeling server can respectively correspond to different operators. The data provider server can transmit collected user data to the modeling server by using the collected user data as a data sample, to complete data modeling. For example, the modeling server can be a data operation platform of ALIPAY, and the data provider server can be a service platform such as a third-party bank or a courier company that is connected to the data operation platform of ALIPAY and that provides a user with Internet services.

In an initial state, the data provider server can collect daily user data at a back end, collect N pieces of user data from the collected user data as data samples, and generate an initialized data sample set based on the collected data samples.

For example, in a shown implementation, N pieces of sensitive data involving user privacy can be collected from the collected user data, and then an initialized data sample set is generated based on the sensitive data.

A specific quantity of N collected data samples is not particularly limited in the present specification, and can be set by a person skilled in the art as needed.

A specific form of the described user data depends on a specific service scenario and a modeling demand, and is not particularly limited in the present specification. For example, in practice, if a score card model for performing risk assessment on a payment transaction initiated by the user needs to be created, the user data can be transaction data generated by the user by using a payment client.

After the data sample set is generated based on the N collected data samples, the data provider server can further preprocess the data samples in the data sample set.

Preprocessing the data samples in the data sample set usually includes the following: performing data cleaning, default value supplementation, normalization processing, or another form of preprocessing on the data samples in the data sample set. By preprocessing the data samples in the data sample set, the collected data samples can be converted into standardized data samples that are suitable for model training.

After preprocessing the data samples in the data sample set, the data provider server can respectively extract the M dimensional data features from the data samples in the data sample set.

A quantity of previously extracted M dimensional data features is not particularly limited in the present specification, and can be selected by a person skilled in the art according to actual modeling demands.

In addition, a specific type of the extracted data feature is not particularly limited in the present specification, and can be manually selected by a person skilled in the art from information actually included in the data sample according to actual modeling demands.

For example, in an implementation, the modeling server can pre-select the M dimensional data features according to actual modeling demands, and then provide the data provider server with the selected data features, so that the data provider server extracts data feature values corresponding to data features in all dimensions from the described data samples.

After separately extracting the M dimensional data features from the data samples in the data sample set, the data provider server can respectively generate data eigenvectors for the data samples based on data feature values corresponding to the extracted M dimensional data features, and then construct the N×M dimensional target matrix based on the data eigenvectors of the data samples.

During implementation, the M dimensional data features can correspond to rows of the target matrix, or can correspond to columns of the target matrix, which is not particularly limited in the present specification.

Referring to FIG. 2, an example that the M dimensional data features correspond to rows of the target matrix is used. The target matrix can be represented in a form shown in FIG. 2. In the target matrix shown in FIG. 2, each column represents one data sample, and each row represents one eigenvector of the M dimensional data feature.

After generating the N×M dimensional target matrix based on the N data samples and the M dimensional data features respectively corresponding to the N data samples, the data provider server can perform encryption calculation on the target matrix based on the PCA algorithm to obtain the N×K dimensional encryption matrix.

The encryption matrix obtained after PCA dimension reduction calculation usually cannot be restored to an original target matrix. Therefore, the encryption matrix obtained after encryption is an encrypted encryption matrix. As such, private data of a user can be protected to the greatest extent.

Figure 3:
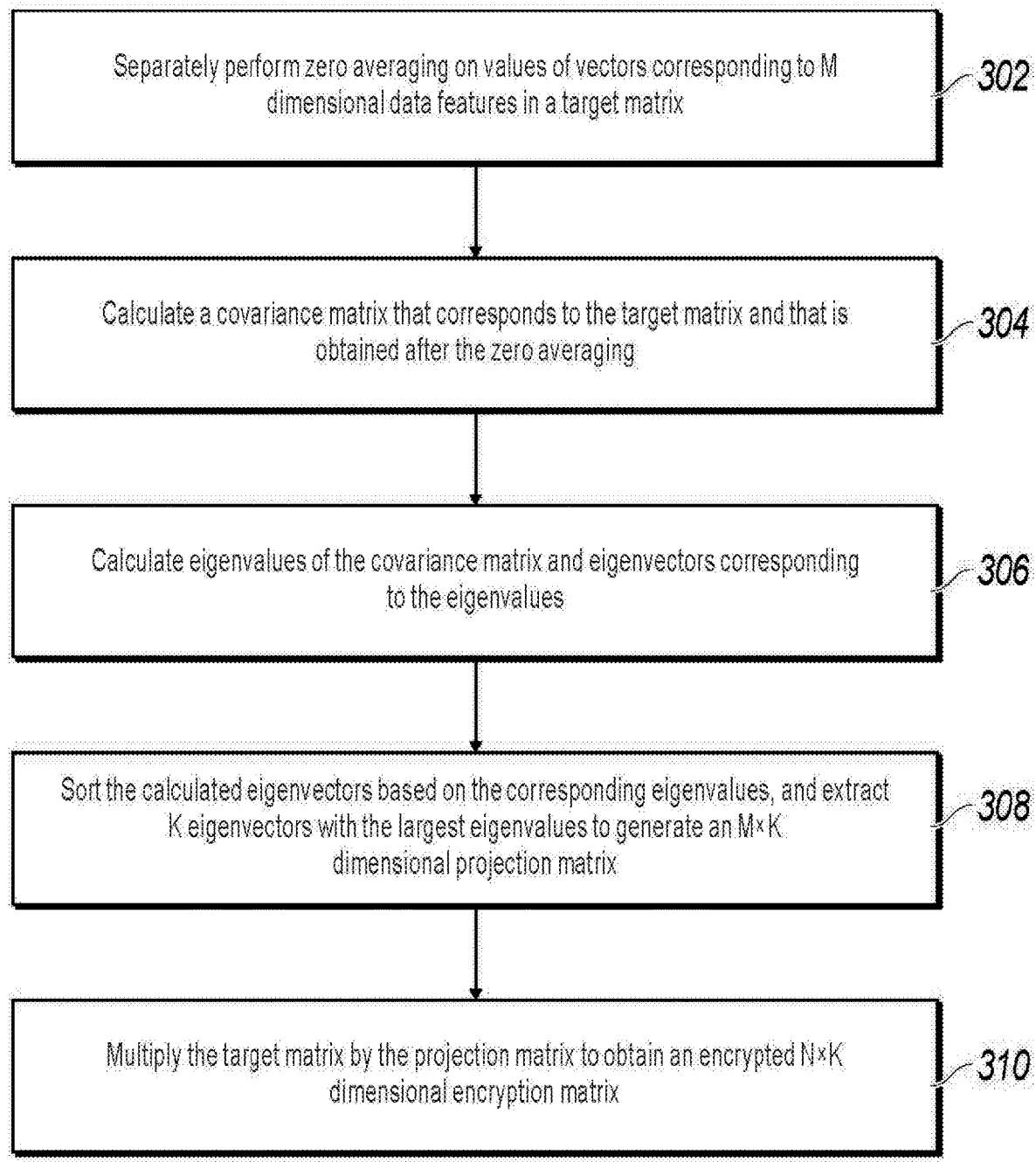
FIG. 3 is a flowchart illustrating encryption calculation performed on the described target matrix based on a PCA algorithm, according to an implementation of the present specification.

FIG. 3 illustrates a procedure of performing encryption calculation on the described target matrix based on a PCA algorithm, and the procedure includes the following steps.

Step 302: Separately perform zero averaging on values of vectors corresponding to the M dimensional data features in the target matrix.

The zero averaging is a process of subtracting an average of a group of values from each of the group of values. In the present specification, the separately performing zero averaging on values of vectors corresponding to the M dimensional data features in the target matrix is a process of separately subtracting an average of the values of the vectors from the values of the vectors corresponding to the M dimensional data features.

During implementation, the vectors corresponding to the M dimensional data features in the target matrix can be successively selected as target vectors; then an average of values of the target vectors is calculated; and the average is separately subtracted from the values of the target vectors.

The target matrix shown in FIG. 2 is used as an example. An average of each row in the target matrix in FIG. 2 can be calculated, and then the average of the row is subtracted from each value in the row.

Step 304: Calculate a covariance matrix that corresponds to the target matrix and that is obtained after the zero averaging.

The covariance matrix is a matrix consisting of covariances between values of vectors in the target matrix.

When the covariance matrix that is of the target matrix and that is obtained after the zero averaging is calculated, a covariance between the vector corresponding to the M dimensional data feature and a vector corresponding to a data feature in another dimension in the target matrix can be calculated, and then the covariance matrix consisting of the calculated covariance is generated based on the calculated covariance.

It is worthwhile to note that a specific process of calculating the covariance matrix is not described in detail in the present specification with reference to a specific example. A person skilled in the art can refer to related technical records when implementing the technical solution described in the present specification. For example, a person skilled in the art can calculate the covariance matrix of the target matrix by using some mature tools such as matlab.

Step 306: Calculate eigenvalues of the covariance matrix and eigenvectors corresponding to the eigenvalues.

After the covariance matrix of the target matrix is calculated, the eigenvalues of the covariance matrix and the eigenvectors corresponding to the eigenvalues can be further calculated. The eigenvalues of the covariance matrix usually depend on an order of the covariance matrix. For example, an N×M covariance matrix includes N×M eigenvalues.

When the eigenvalues and the eigenvectors of the covariance matrix are calculated, a feature polynomial of the covariance matrix can be first obtained, and then all roots of the feature polynomial are calculated. In this case, each calculated root is an eigenvalue. After all the eigenvalues are calculated, the eigenvalues can be substituted into a system of linear equations corresponding to the covariance matrix, to obtain the eigenvectors corresponding to the eigenvalues.

It is worthwhile to note that a specific process of calculating the eigenvalues of the covariance matrix and the eigenvectors corresponding to the eigenvalues is not described in detail in the present specification with reference to a specific example. A person skilled in the art can refer to related technical records when implementing the technical solution described in the present specification. For example, a person skilled in the art can calculate the eigenvalues of the covariance matrix and the eigenvectors corresponding to the eigenvalues by using some mature tools such as matlab.

Step 308: Sort the calculated eigenvectors based on the corresponding eigenvalues, and extract K eigenvectors with the largest eigenvalues to generate an M×K dimensional projection matrix.

After all the eigenvalues of the covariance matrix and the eigenvectors corresponding to the eigenvalues are calculated, the eigenvectors can be further sorted based on the corresponding eigenvalues, for example, sorted in descending order. After the eigenvectors are sorted based on the eigenvalues, the first K eigenvectors with the largest eigenvalues can be extracted to generate the M×K dimensional projection matrix.

Here, K can be less than M. In practice, K can be manually specified by a person skilled in the art with reference to actual demands.

Step 310: Multiply the target matrix by the projection matrix to obtain the encrypted N×K dimensional encryption matrix.

The M×K dimensional projection matrix is a projection matrix obtained by finally encrypting an original target matrix. When the original N×M target matrix is encrypted based on the M×K dimensional projection matrix, the original high-dimensional target matrix can be mapped to low-dimensional projection matrix space.

During implementation, the original N×M target matrix can be mapped to the M×K dimensional projection matrix space by multiplying the original N×M target matrix by the M×K dimensional projection matrix (in other words, through linear projection). The original N×M target matrix can be right-multiplied or left-multiplied by the M×K dimensional projection matrix.

For example, if the M dimensional data features are used as columns of the target matrix, the original N×M target matrix can be right-multiplied by the M×K dimensional projection matrix, and the original N×M target matrix can be mapped to the M×K dimensional projection matrix space. Therefore, during implementation, the original N×M target matrix can be left-multiplied by the M×K dimensional projection matrix, a left multiplication result is transposed, and the original N×M target matrix is mapped to the M×K dimensional projection matrix space.

After the original N×M target matrix is mapped to the M×K dimensional projection matrix space, the N×K dimensional encryption matrix can be obtained. In this case, the encryption matrix is a data sample obtained after the M×K dimensional projection matrix is encrypted.

In a shown implementation, the data provider server can further locally store the projection matrix as the encryption matrix after calculating the M×K dimensional projection matrix by using the previously shown calculation process.

Subsequently, the data provider server collects the latest N data samples again; generates an N×M dimensional matrix based on the N data samples and M dimensional data features respectively corresponding to the N data samples; and then can determine whether the projection matrix is locally stored.

In response to determining that the projection matrix is locally stored, the data provider server encrypts the N×M matrix by directly using the stored projection matrix. A specific encryption process is not described in detail again.

Certainly, in response to determining that the projection matrix is not locally stored, the data provider server can perform, based on the described PCA algorithm based dimension reduction process, encryption calculation on the described encryption matrix to generate the described projection matrix.

In addition, it is worthwhile to note that, in practice, if the M dimensional data features change in terms of a dimension (for example, a data feature in a new dimension is added or a data feature in some dimensions is deleted), or meanings represented by some or all of the M dimensional data features change, the data provider server can recalculate the projection matrix based on the described PCA algorithm based encryption calculation process, and update the locally stored projection matrix by using the recalculated projection matrix.

As such, a locally stored invalid encryption matrix can be updated in time when a data feature needed for modeling is updated, thereby preventing modeling accuracy from being affected by a loss of an amount of data information when the original target matrix is encrypted by using the invalid encryption matrix.

In the present specification, after dimension reduction calculation is performed on the target matrix based on the described PCA algorithm based encryption calculation process to obtain the encrypted N×K dimensional encryption matrix, the data provider server can transmit the encryption matrix as a training sample to the modeling server connected to the data provider server.

After receiving the encryption matrix transmitted by the data provider server, the modeling server can train a machine learning model by using the encryption matrix as a training sample.

In a shown implementation, the modeling server can combine the encryption matrix with a locally stored training sample, and then train the machine learning model based on a combined training sample.

Figure 4:
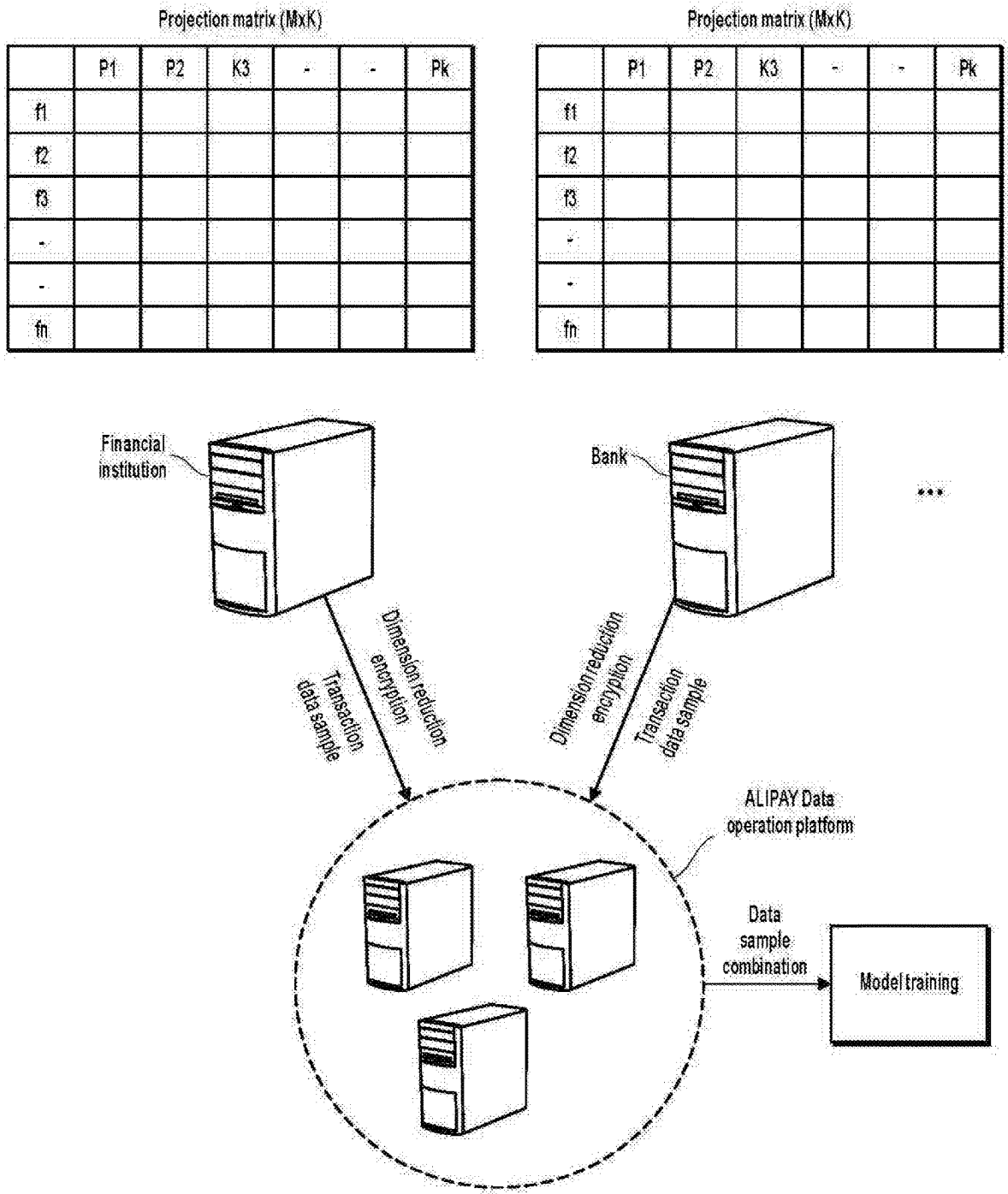
FIG. 4 is a schematic diagram illustrating joint modeling performed by combining a plurality of data samples, according to an implementation of the present specification.

FIG. 4 is a schematic diagram illustrating joint modeling performed by combining a plurality of data samples, according to the present specification.

In a scenario, the described modeling server can be a data operation platform of ALIPAY, and the data provider server can include a service platform such as a bank or a third-party financial institution that is connected to the data operation platform of ALIPAY and that provides a user with Internet services. In practice, the data operation platform of ALIPAY is a non-credited third party for the data provider server. Therefore, the data provider server directly provides local user transaction data for the data operation platform of ALIPAY for data modeling. Consequently, user privacy may be disclosed during data transmission. In this case, each data provider server can perform, based on a PCA algorithm and the projection matrix, encryption calculation on an N×M dimensional target matrix generated based on an original transaction data sample, to obtain an N×K dimensional encryption matrix, and then transmit the encryption matrix to the data operation platform of ALIPAY as a training sample. The data operation platform of ALIPAY can combine a received training sample provided by the data provider server with a localized data sample, and then train the machine learning model based on a combined training sample, for example, combine user transaction data provided by a bank or a third-party financial institution with localized user transaction data in the data operation platform of ALIPAY to jointly train a score card model for assessing a transaction risk of the user.

It is worthwhile to note that a specific type of the machine learning model is not particularly limited in the present specification. For example, in practice, the machine learning model can be a supervised prediction model established based on a supervised machine learning algorithm (such as a regression algorithm), for example, a score card model that is used to assess a transaction risk of the user and that is trained based on payment transaction data of the user; or can be an unsupervised classification model established based on an unsupervised machine learning algorithm (for example, a k-means algorithm), for example, a recommendation model that is used to deliver an advertisement or page content to the user and that is trained based on a click and access data of the user.

After the machine learning model is trained by using the previously described modeling methods, the data provider server can still subsequently encrypt, based on the projection matrix, a data matrix constructed based on a collected data sample and a related data feature, and then transmit the data matrix to the machine learning model for calculation, to obtain an output result of the model. For example, the machine learning model is the score card model that is used to assess the transaction risk of the user and that is trained based on the payment transaction data of the user. Based on the projection matrix, the data provider server can perform encryption calculation on the data matrix constructed based on the collected user transaction data, and then transmit the data matrix to the score card model as input data, to obtain a risk score corresponding to each transaction.

Figure 5:
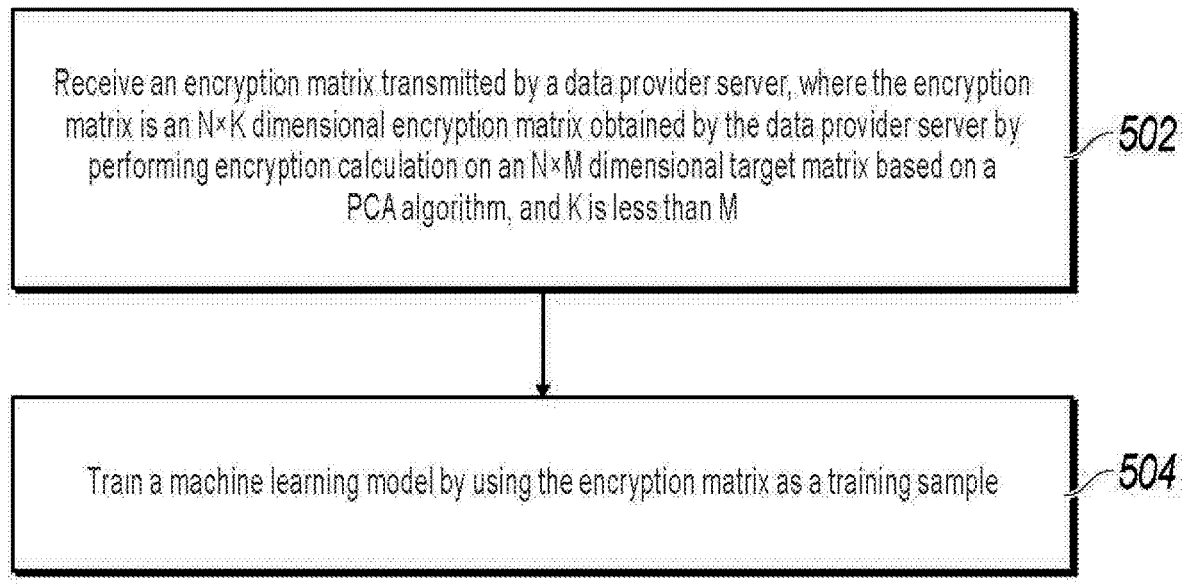
FIG. 5 is a flowchart illustrating a method for training a machine learning model, according to an implementation of the present specification.

The above describes the method for encrypting data provided in the present implementation of the present specification. Referring to FIG. 5, based on a same idea, an implementation of the present specification provides a method for training a machine learning model. The method is applied to a modeling server, and includes the following steps:

Step 502: Receive an encryption matrix transmitted by a data provider server, where the encryption matrix is an N×K dimensional encryption matrix obtained by the data provider server by performing encryption calculation on an N×M dimensional target matrix based on a PCA algorithm, and K is less than M.

Step 504: Train a machine learning model by using the encryption matrix as a training sample.

For an implementation process corresponding to the technical features in the steps shown in FIG. 5, details are omitted in the present implementation, and references can be made to the descriptions in the previous implementation.

It can be seen from the described implementations that the N×M dimensional target matrix is generated based on the N data samples and the M dimensional data features respectively corresponding to the N data samples; encryption calculation is performed on the target matrix based on the PCA algorithm to obtain the N×K dimensional encryption matrix; and then the encryption matrix is transmitted to the modeling server, so that the modeling server trains the machine learning model by using the encryption matrix as the training sample.

After the encryption matrix encrypted based on the PCA algorithm is transmitted to the modeling server, the modeling server usually cannot restore an original target matrix based on the encrypted encryption matrix, so that private data of a user can be protected to the greatest extent, thereby alleviating privacy disclosure of the user caused in a process of submitting a data sample to the modeling server for model training.

In addition, after encryption calculation is performed on the target matrix based on the PCA algorithm, the obtained encryption matrix includes fewer dimensions than the original target matrix, so that transmission overheads for transmitting a data sample to the modeling server can be reduced.

In addition, an amount of information in an original data sample can be retained to the greatest extent when encryption calculation is performed on the target matrix by using the PCA algorithm, so that model training accuracy can still be ensured when the encrypted encryption matrix is transmitted to the modeling server for model training.

The present specification further provides an implementation of an apparatus for encrypting data corresponding to the described method implementation.

Figure 6:
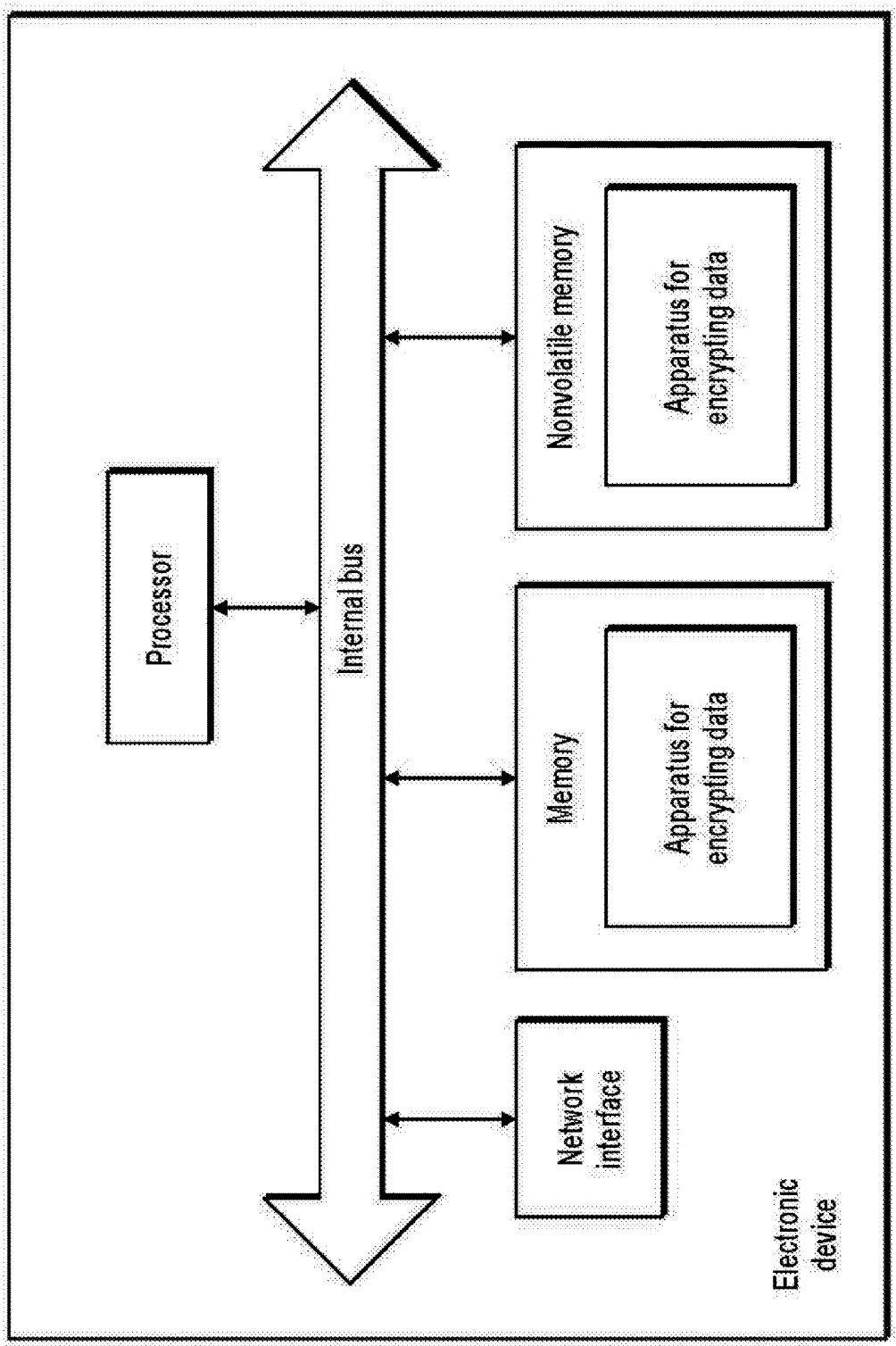
FIG. 6 is a diagram illustrating a hardware structure of an electronic device including an apparatus for encrypting data, according to an implementation of the present specification.

The implementation of the apparatus for encrypting data in the present specification can be applied to an electronic device. The apparatus implementation can be implemented by software, hardware, or a combination of hardware and software. Software implementation is used as an example. As a logic apparatus, the apparatus is formed by reading a corresponding computer program instruction in a nonvolatile memory to a memory by a processor of the electronic device that the apparatus is located in. In terms of hardware, FIG. 6 is a hardware structural diagram illustrating an electronic device that an apparatus for encrypting data is located in, according to the present specification. In addition to a processor, a memory, a network interface, and a nonvolatile memory shown in FIG. 6, the electronic device that the apparatus in the present implementation is located in usually can include other hardware based on an actual function of the electronic device. Details are omitted here for simplicity.

Figure 7:
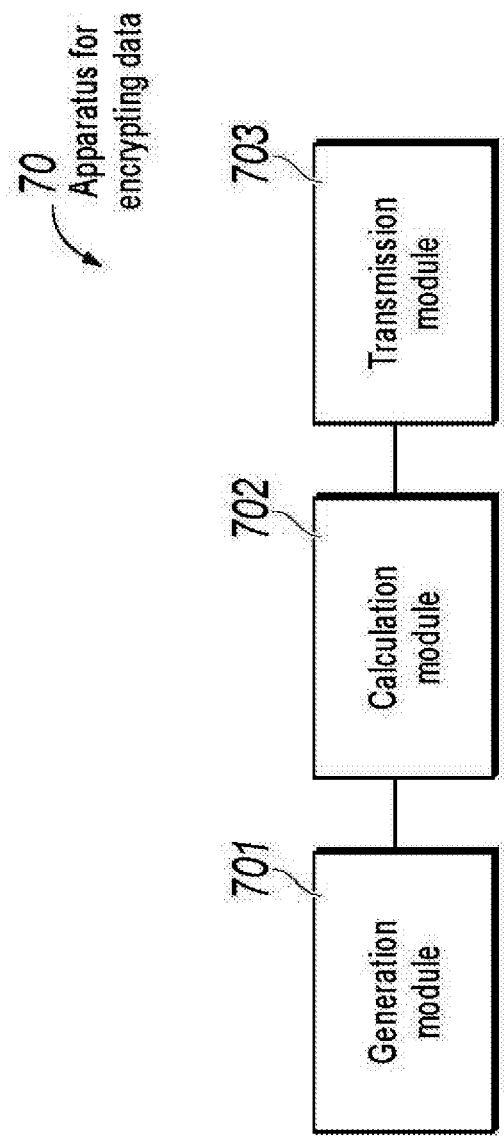
FIG. 7 is a logical block diagram illustrating an apparatus for encrypting data, according to an implementation of the present specification.

FIG. 7 is a block diagram illustrating an apparatus for encrypting data, according to an example implementation of the present specification.

Referring to FIG. 7, the apparatus 70 for encrypting data can be applied to the electronic device shown in FIG. 6, and include a generation module 701, a calculation module 702, and a transmission module 703.

The generation module 701 is configured to generate an N×M dimensional target matrix based on N data samples and M dimensional data features respectively corresponding to the N data samples.

The calculation module 702 is configured to perform encryption calculation on the target matrix based on a PCA algorithm to obtain an N×K dimensional encryption matrix, where K is less than M.

The transmission module 703 is configured to transmit the encryption matrix to a modeling server, where the encryption matrix is used to train a machine learning model.

In the present implementation, the calculation module 702 is configured to: separately perform zero averaging on values of vectors corresponding to the M dimensional data features in the target matrix; calculate a covariance matrix that corresponds to the target matrix and that is obtained after the zero averaging; calculate eigenvalues of the covariance matrix and eigenvectors corresponding to the eigenvalues; sort the calculated eigenvectors based on the corresponding eigenvalues, and extract K eigenvectors with the largest eigenvalues to generate an M×K dimensional projection matrix; and multiply the target matrix by the projection matrix to obtain the N×K dimensional encryption matrix.

In the present implementation, the apparatus further includes the following: a storage module 704 (not shown in FIG. 7), configured to locally store the projection matrix as the encryption matrix.

In the present implementation, the calculation module 702 is further configured to: determine whether the projection matrix is locally stored; in response to determining that the projection matrix is locally stored, multiply the N×M dimensional target matrix by the projection matrix to obtain the N×K dimensional encryption matrix; and in response to determining that the projection matrix is not locally stored, perform encryption calculation on the target matrix based on the PCA algorithm to obtain the N×K dimensional encryption matrix.

In the present implementation, the apparatus 70 further includes the following: an update module 705 (not shown in FIG. 7), configured to: if the data features change in terms of a dimension, or meanings represented by the data features change, perform encryption calculation on the target matrix based on the PCA algorithm again, and update the locally stored projection matrix based on the recalculated projection matrix.

The present specification further provides an implementation of an apparatus for training a machine learning model corresponding to the described method implementation.

Figure 8:
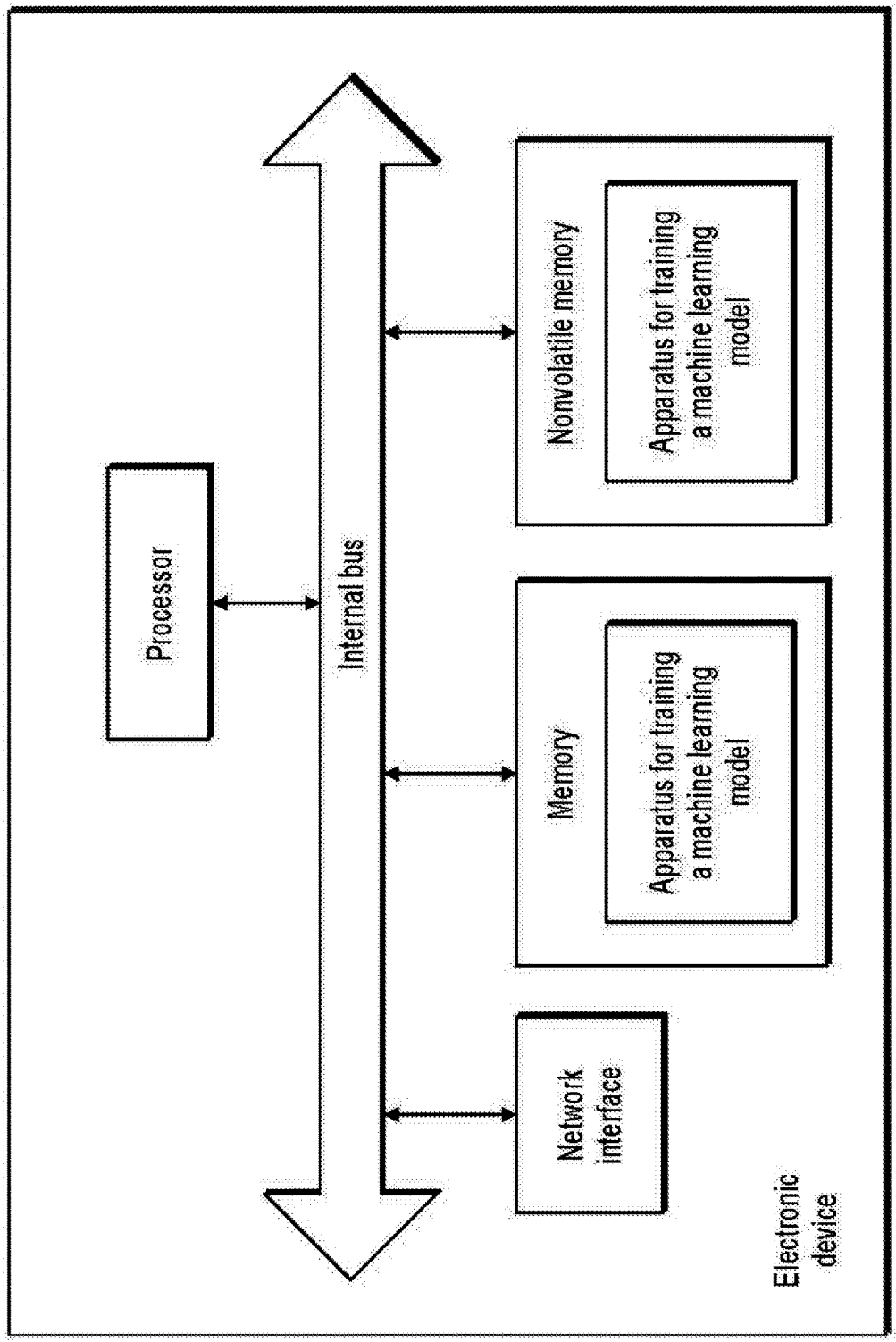
FIG. 8 is a diagram illustrating a hardware structure of an electronic device including an apparatus for training a machine learning model, according to an implementation of the present specification.

The implementation of the apparatus for training a machine learning model in the present specification can be applied to an electronic device. The apparatus implementation can be implemented by software, hardware, or a combination of hardware and software. Software implementation is used as an example. As a logic apparatus, the apparatus is formed by reading a corresponding computer program instruction in a nonvolatile memory to a memory by a processor of the electronic device that the apparatus is located in. In terms of hardware, FIG. 8 is a hardware structural diagram illustrating an electronic device that an apparatus for training a machine learning model is located in, according to the present specification. In addition to a processor, a memory, a network interface, and a nonvolatile memory shown in FIG. 8, the electronic device that the apparatus in the present implementation is located in usually can include other hardware based on an actual function of the electronic device. Details are omitted here for simplicity.

Figure 9:
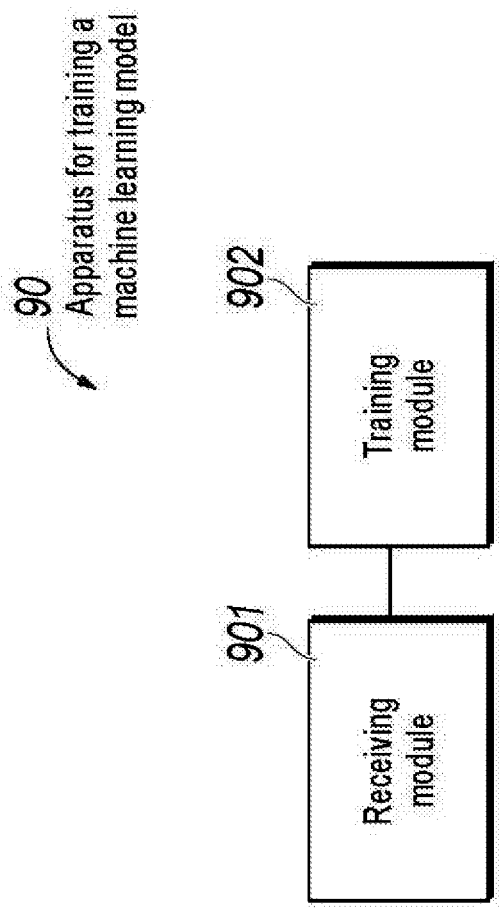
FIG. 9 is a logical block diagram illustrating an apparatus for training a machine learning model, according to an implementation of the present specification.

FIG. 9 is a block diagram illustrating an apparatus for training a machine learning model, according to an example implementation of the present specification.

Referring to FIG. 9, the apparatus 90 for training a machine learning model can be applied to the electronic device shown in FIG. 8, and include a receiving module 901 and a training module 902.

The receiving module 901 is configured to receive an encryption matrix transmitted by a data provider server, where the encryption matrix is an N×K dimensional encryption matrix obtained by the data provider server by performing encryption calculation on an N×M dimensional target matrix based on a PCA algorithm, and K is less than M.

The training module 902 is configured to train a machine learning model by using the encryption matrix as a training sample.

In the present implementation, the training module 902 is further configured to: combine the encryption matrix with a local training sample by using the encryption matrix as the training sample, and train the machine learning model based on a combined training sample.

For implementation processes of functions and roles of the modules in the apparatus, references can be made to implementation processes of corresponding steps in the described method. Details are omitted here for simplicity.

Because an apparatus implementation basically corresponds to a method implementation, for related parts, references can be made to partial descriptions in the method implementation. The described apparatus implementation is merely an example. The units described as separate parts can or cannot be physically separate, and parts displayed as units can or cannot be physical units, in other words, can be located in one position, or can be distributed in a plurality of network units. Some or all of the modules can be selected based on actual demands to achieve the objectives of the solutions of the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The present specification further provides an implementation of a system for training a machine learning model corresponding to the described method implementation.

The system for training a machine learning model can include a data provider server and a modeling server.

The data provider server can generate an N×M dimensional target matrix based on N data samples and M dimensional data features respectively corresponding to the N data samples; perform encryption calculation on the target matrix based on a PCA algorithm to obtain an N×K dimensional encryption matrix, where K is less than M; and transmit the encryption matrix to the modeling server.

The modeling server is configured to train a machine learning model based on the encryption matrix.

In the present implementation, the modeling server is further configured to: combine the encryption matrix with a local training sample by using the encryption matrix as a training sample, and train the machine learning model based on a combined training sample.

The present specification further provides an implementation of an electronic device corresponding to the described method implementation. The electronic device includes a processor and a memory configured to store a machine executable instruction. The processor and the memory are generally connected to each other by using an internal bus. In other possible implementations, the device can further include an external interface that is capable of communicating with another device or component.

In the present implementation, by reading and executing the machine executable instruction that is stored in the memory and that corresponds to control logic for data encryption shown in FIG. 1, the processor is configured to: generate an N×M dimensional target matrix based on N data samples and M dimensional data features respectively corresponding to the N data samples; perform encryption calculation on the target matrix based on a PCA algorithm to obtain an N×K dimensional encryption matrix, where K is less than M; and transmit the encryption matrix to a modeling server, where the encryption matrix is used to train a machine learning model.

In the present example, by reading and executing the machine executable instruction that is stored in the memory and that corresponds to control logic for data encryption shown in FIG. 1, the processor is further configured to: separately perform zero averaging on values of vectors corresponding to the M dimensional data features in the target matrix; calculate a covariance matrix that corresponds to the target matrix and that is obtained after the zero averaging; calculate eigenvalues of the covariance matrix and eigenvectors corresponding to the eigenvalues; sort the calculated eigenvectors based on the corresponding eigenvalues, and extract K eigenvectors with the largest eigenvalues to generate an M×K dimensional projection matrix; and multiply the target matrix by the projection matrix to obtain the encrypted N×K dimensional encryption matrix.

In the present example, by reading and executing the machine executable instruction that is stored in the memory and that corresponds to control logic for data encryption shown in FIG. 1, the processor is further configured to: locally store the projection matrix as the encryption matrix.

In the present example, by reading and executing the machine executable instruction that is stored in the memory and that corresponds to control logic for data encryption shown in FIG. 1, the processor is further configured to: determine whether the projection matrix is locally stored; in response to determining that the projection matrix is locally stored, multiply the N×M dimensional target matrix by the projection matrix to obtain the N×K dimensional encryption matrix; and in response to determining that the projection matrix is not locally stored, perform encryption calculation on the target matrix based on the PCA algorithm to obtain the N×K dimensional encryption matrix.

In the present example, by reading and executing the machine executable instruction that is stored in the memory and that corresponds to control logic for data encryption, the processor is further configured to: if the data features change in terms of a dimension, or meanings represented by the data features change, perform encryption calculation on the target matrix based on the PCA algorithm again, and update the locally stored projection matrix based on the recalculated projection matrix.

The present specification further provides an implementation of another electronic device corresponding to the described method implementation. The electronic device includes a processor and a memory configured to store a machine executable instruction. The processor and the memory are generally connected to each other by using an internal bus. In other possible implementations, the device can further include an external interface that is capable of communicating with another device or component.

In the present implementation, by reading and executing the machine executable instruction that is stored in the memory and that corresponds to control logic for machine learning model training shown in FIG. 5, the processor is configured to: receive an encryption matrix transmitted by a data provider server, where the encryption matrix is an N×K dimensional encryption matrix obtained by the data provider server by performing encryption calculation on an N×M dimensional target matrix based on a PCA algorithm, and K is less than M; and train a machine learning model by using the encryption matrix as a training sample.

In the present implementation, by reading and executing the machine executable instruction that is stored in the memory and that corresponds to control logic for machine learning model training shown in FIG. 5, the processor is further configured to: combine the encryption matrix with a local training sample by using the encryption matrix as the training sample, and train the machine learning model based on a combined training sample.

A person skilled in the art can easily figure out another implementation of the present specification after considering the present specification and practicing the present disclosure. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The specification and the implementations are merely considered as examples, and the actual scope and the spirit of the present specification are described by the following claims.

It should be understood that the present specification is not limited to the precise structures that have been described above and shown in the accompanying drawings, and various modifications and changes can be made without departing from the scope of the present specification. The scope of the present specification is limited only by the appended claims.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multitasking and parallel processing can be advantageous.

The previous descriptions are merely examples of implementations of the present application, but are not intended to limit the present application. Any modification, equivalent replacement, or improvement made without departing from the spirit and principle of the present application should fall within the protection scope of the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for encrypting data performed by one or more computers, the method comprising:
    collecting, by a data provider server, user data at a back end, wherein the user data includes payment transaction data of a user;
    receiving, by the data provider server and from a modeling server, M dimensional data features, wherein the M dimensional data features are selected by the modeling server according to one or more modeling demands of the modeling server;
    collecting, by the data provider server and from the collected user data, N pieces of user private data as N data samples;
    generating, by the data provider server, an N×M dimensional target matrix based on the N data samples and the received M dimensional data features;
    determining, by the data provider server, whether an M×K dimensional projection matrix is locally stored;
    in response to determining that the M×K dimensional projection matrix is not locally stored, performing, by the data provider server, an encryption calculation on the N×M dimensional target matrix based on a Principal Component Analysis (PCA) algorithm to obtain an N×K dimensional encryption matrix, wherein K is less than M;
    in response to determining that the M×K dimensional projection matrix is locally stored, multiplying the N×M dimensional target matrix by the locally stored M×K dimensional projection matrix to obtain the N×K dimensional encryption matrix; and
    transmitting, by the data provider server and to the modeling server, the N×K dimensional encryption matrix, wherein the modeling server combines the N×K dimensional encryption matrix with a local training sample of the modeling server to obtain a combined training sample, and trains a machine learning model by using the combined training sample, and the machine learning model is a model that performs risk assessment on a payment transaction initiated by the user.

2. The method according to claim 1, wherein performing the encryption calculation on the N×M dimensional target matrix based on the PCA algorithm to obtain the N×K dimensional encryption matrix comprises:
    separately performing zero averaging on values of vectors corresponding to the M dimensional data features in the N×M dimensional target matrix;

calculating a covariance matrix that corresponds to the N×M dimensional target matrix and that is obtained after the zero averaging;

calculating eigenvalues of the covariance matrix and eigenvectors corresponding to the eigenvalues;

sorting the calculated eigenvectors based on the corresponding eigenvalues, and extracting, from the calculated eigenvectors, K eigenvectors corresponding to K largest eigenvalues of the calculated eigenvalues to generate the M×K dimensional projection matrix; and multiplying the N×M dimensional target matrix by the M×K dimensional projection matrix to obtain the N×K dimensional encryption matrix.

3. The method according to claim 2, further comprising: locally storing the M×K dimensional projection matrix as an encryption matrix.

4. The method according to claim 3, further comprising:

in response to determining that the M dimensional data features change:

performing a second encryption calculation on the N×M dimensional target matrix based on the PCA algorithm; and updating the locally stored M×K dimensional projection matrix based on a recalculated projection matrix.

5. The method according to claim 1, wherein the data provider server and the modeling server correspond to different operators.

6. The method according to claim 1, wherein the data provider server is a service platform that provides the user with Internet services, and the modeling server is a data operation platform that is a non-credited third party for the data provider server.

7. The method according to claim 1, wherein the M dimensional data features are pre-selected by the modeling server.

8. One or more non-transitory, computer-readable media storing one or more instructions executable by a computer system to perform operations comprising:

collecting, by a data provider server, user data at a back end, wherein the user data includes payment transaction data of a user;

receiving, by the data provider server and from a modeling server, M dimensional data features, wherein the M dimensional data features are selected by the modeling server according to one or more modeling demands of the modeling server;

collecting, by the data provider server and from the collected user data, N pieces of user private data as N data samples;

generating, by the data provider server, an N×M dimensional target matrix based on the N data samples and the received M dimensional data features;

determining, by the data provider server, whether an M×K dimensional projection matrix is locally stored;

in response to determining that the M×K dimensional projection matrix is not locally stored, performing, by the data provider server, an encryption calculation on the N×M dimensional target matrix based on a Principal Component Analysis (PCA) algorithm to obtain an N×K dimensional encryption matrix, wherein K is less than M;

in response to determining that the M×K dimensional projection matrix is locally stored, multiplying the N×M dimensional target matrix by the locally stored M×K dimensional projection matrix to obtain the N×K dimensional encryption matrix; and transmitting, by the data provider server and to the modeling server, the N×K dimensional encryption matrix, wherein the modeling server combines the N×K dimensional encryption matrix with a local training sample of the modeling server to obtain a combined training sample, and trains a machine learning model by using the combined training sample, and the machine learning model is a model that performs risk assessment on a payment transaction initiated by the user.

9. The one or more non-transitory, computer-readable media according to claim 8, wherein performing the encryption calculation on the N×M dimensional target matrix based on the PCA algorithm to obtain the N×K dimensional encryption matrix comprises:

separately performing zero averaging on values of vectors corresponding to the M dimensional data features in the N×M dimensional target matrix;

calculating a covariance matrix that corresponds to the N×M dimensional target matrix and that is obtained after the zero averaging;

calculating eigenvalues of the covariance matrix and eigenvectors corresponding to the eigenvalues;

sorting the calculated eigenvectors based on the corresponding eigenvalues, and extracting, from the calculated eigenvectors, K eigenvectors corresponding to K largest eigenvalues of the calculated eigenvalues to generate the M×K dimensional projection matrix; and multiplying the N×M dimensional target matrix by the M×K dimensional projection matrix to obtain the N×K dimensional encryption matrix.

10. The one or more non-transitory, computer-readable media according to claim 9, the operations further comprising:

locally storing the M×K dimensional projection matrix as an encryption matrix.

11. The one or more non-transitory, computer-readable media according to claim 10, the operations further comprising:

in response to determining that the M dimensional data features change:

performing a second encryption calculation on the N×M dimensional target matrix based on the PCA algorithm; and updating the locally stored M×K dimensional projection matrix based on a recalculated projection matrix.

12. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

collecting, by a data provider server, user data at a back end, wherein the user data includes payment transaction data of a user;

receiving, by the data provider server and from a modeling server, M dimensional data features, wherein the M dimensional data features are selected by the modeling server according to one or more modeling demands of the modeling server;

collecting, by the data provider server and from the collected user data, N pieces of user private data as N data samples;

generating, by the data provider server, an N×M dimensional target matrix based on the N data samples and the received M dimensional data features;

determining, by the data provider server, whether an M×K dimensional projection matrix is locally stored;

in response to determining that the M×K dimensional projection matrix is not locally stored, performing, by the data provider server, an encryption calculation on the N×M dimensional target matrix based on a Principal Component Analysis (PCA) algorithm to obtain an N×K dimensional encryption matrix, wherein K is less than M;

in response to determining that the M×K dimensional projection matrix is locally stored, multiplying the N×M dimensional target matrix by the locally stored M×K dimensional projection matrix to obtain the N×K dimensional encryption matrix; and transmitting, by the data provider server and to the modeling server, the N×K dimensional encryption matrix, wherein the modeling server combines the N×K dimensional encryption matrix with a local training sample of the modeling server to obtain a combined training sample, and trains a machine learning model by using the combined training sample, and the machine learning model is a model that performs risk assessment on a payment transaction initiated by the user.

13. The computer-implemented system according to claim 12, wherein performing the encryption calculation on the N×M dimensional target matrix based on the PCA algorithm to obtain the N×K dimensional encryption matrix comprises:

separately performing zero averaging on values of vectors corresponding to the M dimensional data features in the N×M dimensional target matrix;

calculating a covariance matrix that corresponds to the N×M dimensional target matrix and that is obtained after the zero averaging;

calculating eigenvalues of the covariance matrix and eigenvectors corresponding to the eigenvalues;

sorting the calculated eigenvectors based on the corresponding eigenvalues, and extracting, from the calculated eigenvectors, K eigenvectors corresponding to K largest eigenvalues of the calculated eigenvalues to generate the M×K dimensional projection matrix; and multiplying the N×M dimensional target matrix by the M×K dimensional projection matrix to obtain the N×K dimensional encryption matrix.

14. The computer-implemented system according to claim 13, the operations further comprising:

locally storing the M×K dimensional projection matrix as an encryption matrix.

15. The computer-implemented system according to claim 14, the operations further comprising:

in response to determining that the M dimensional data features change:

performing a second encryption calculation on the N×M dimensional target matrix based on the PCA algorithm; and updating the locally stored M×K dimensional projection matrix based on a recalculated projection matrix.

* * * * *